(12) United States Patent
Simpson et al.

(10) Patent No.: US 6,738,156 B1
(45) Date of Patent: May 18, 2004

(54) REUSABLE JOB EDITING AND DELIVERY SYSTEM

(75) Inventors: Shell S. Simpson, Boise, ID (US); Ward S. Foster, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/407,024

(22) Filed: Sep. 28, 1999

(51) Int. Cl.[7] .............................................. G06K 15/00
(52) U.S. Cl. ...................... 358/1.15; 358/1.17
(58) Field of Search .................. 358/1.1, 1.2, 462, 358/1.6, 453, 1.9, 452, 1.13, 1.15, 403, 1.16, 1.17, 1.18, 530, 531, 537, 538, 540

(56) References Cited

U.S. PATENT DOCUMENTS 5,495,561 A * 2/1996 Holt ........................... 358/1.15
5,566,278 A * 10/1996 Patel et al. ................. 358/1.15

FOREIGN PATENT DOCUMENTS

| GB | 2355828 A | 5/2001 |
|----|-----------|--------|
| WO | WO95/00898 | 1/1995 |
| WO | WO95/06279 | 3/1995 |

* cited by examiner

*Primary Examiner*—Arthur G. Evans (57) ABSTRACT

A computer implemented method by which a user edits and delivers a print job in a computer system, the method including providing a printing software object as a COM component for editing and delivering a print job and providing job data of the print job to the printing software object, by a print job creator, in the form of references to pages. The references to pages are used by the software printing object, to call and display the pages on a need basis. The user edits the job data of the print job based on the displayed pages and the print job is delivered for processing in accordance with the edited job data.

7 Claims, 8 Drawing Sheets

```
class IPageImage : IUnknown {
    virtual
    DRAWGDIRESULT DrawGDI(
        DRAWMODE drawMode,   // display, printer, metafile
        HDC *hDC,            // target device contect supplied by PrintCenter
        POINT upperLeft,     // upper left point of page image in device context
        POINT lowerRight     // lower right point of page image in device context
                             // upperLeft and lowerRight imply translation, orthogonal
                             //   rotation, and scaling
    ) = 0;                   // pure virtual virtual ISettingsBundle *GetSettingsBundle() = 0;
};

class IPageImageSet : IUnknown {
    virtual ISettingsBundle *GetSettingsBundle() = 0;
};
```

Fig. 4

```
class IJob : IUnknown { virtual IDocument *GetDefaultDocument() = 0;
    virtual ISettingsBundle *GetSettingsBundle() = 0;
    virtual void MergeSettingsBundle( ISettingsBundle *bundle ) = 0;
    virtual void ReplaceSettingsBundle( ISettingsBundle *bundle ) = 0;

```
class IJobEditingAndDeliverySystem : IUnknown {
    virtual
    void AcceptPageImages(
        IPageImageSet *set,         // Image set that images are a member of
        IPageImage *images[],       // Images to accept into system
        Count numImages             // Number of images
    ) = 0;

virtual IJob *GetJob() = 0;     // Allows caller to get job, which
                                    // enables advanced editing
};
```

REUSABLE JOB EDITING AND DELIVERY SYSTEM

FIELD OF THE INVENTION

This invention relates generally to the field of software for editing and delivering printer jobs and more particularly to a method and system by which a user can edit and deliver a print job in a computer system where the print job can originate from different applications and platforms.

BACKGROUND OF THE INVENTION

A new class of printing software has coming into use recently. This class of printing software allows jobs to be edited outside of a printer driver. This class of software is of particular interest because it makes printing features provided by a printer visible to a user. On the Microsoft Windows platforms ("Windows"), the predominant platform for home and office printing, the only user interface related to printing that most users interact with comes from the application. This user interface (i.e. print dialog box) often does not expose capabilities that differentiate the different printer products. Consequently, investment in new hardware, firmware, and software technologies for printer products goes largely unnoticed and unused by the majority of the users.

For the purposes of this application this new class of printing software is referred to as job editing and delivery systems. These systems capture a job from an application and provide the user with the opportunity to interactively modify the job settings. Users can choose options like n-up ("n" images on one sheet), watermarks, and booklet printing—among others. After the user has finished choosing the desired settings, the job is then sent to a printer of the user's choice. Some job editing and delivery systems track the job's status with varying degrees of success.

There are several commercial examples of job editing and delivery systems in existence today. A non-exhaustive list of these types of systems include:

(i) FinePrint by Single Track Software (www.sinciletrack.com);

(ii) printChef by MindGate (www.mindgate.com);

(iii) HandyPrint; or (iv) Power PrintCache by LaserTools.

All of these job editing and delivery systems are implemented as a monolithic, non-reusable system. Although they are reusable in the sense that they can capture and process print jobs from most Windows applications, they are non-reusable in the sense that they cannot be used to capture and process jobs from non-Windows applications that are used by Windows end-users. For example, it would require a significant design change for any of the current products, such as those mentioned above, to support a Windows client printing from a UNIX host. Accordingly, a problem with the current systems is that a Windows end-user does not have the same rich printing experience regardless of which system the print job originates from.

These job editing and delivery systems are also non-reusable because they cannot be more tightly integrated into applications. In order to capture job information, they require the application to pass job information to the Windows or other operating systems' printing system. Before they can offer a print preview, this information must pass through the printing system, which causes a significant delay.

Furthermore, the prior art systems are not well integrated into the applications and, therefore, can not be easily modified by the applications. That is, prior art job editing and delivery systems are not easily configurable by applications.

Figure 1:
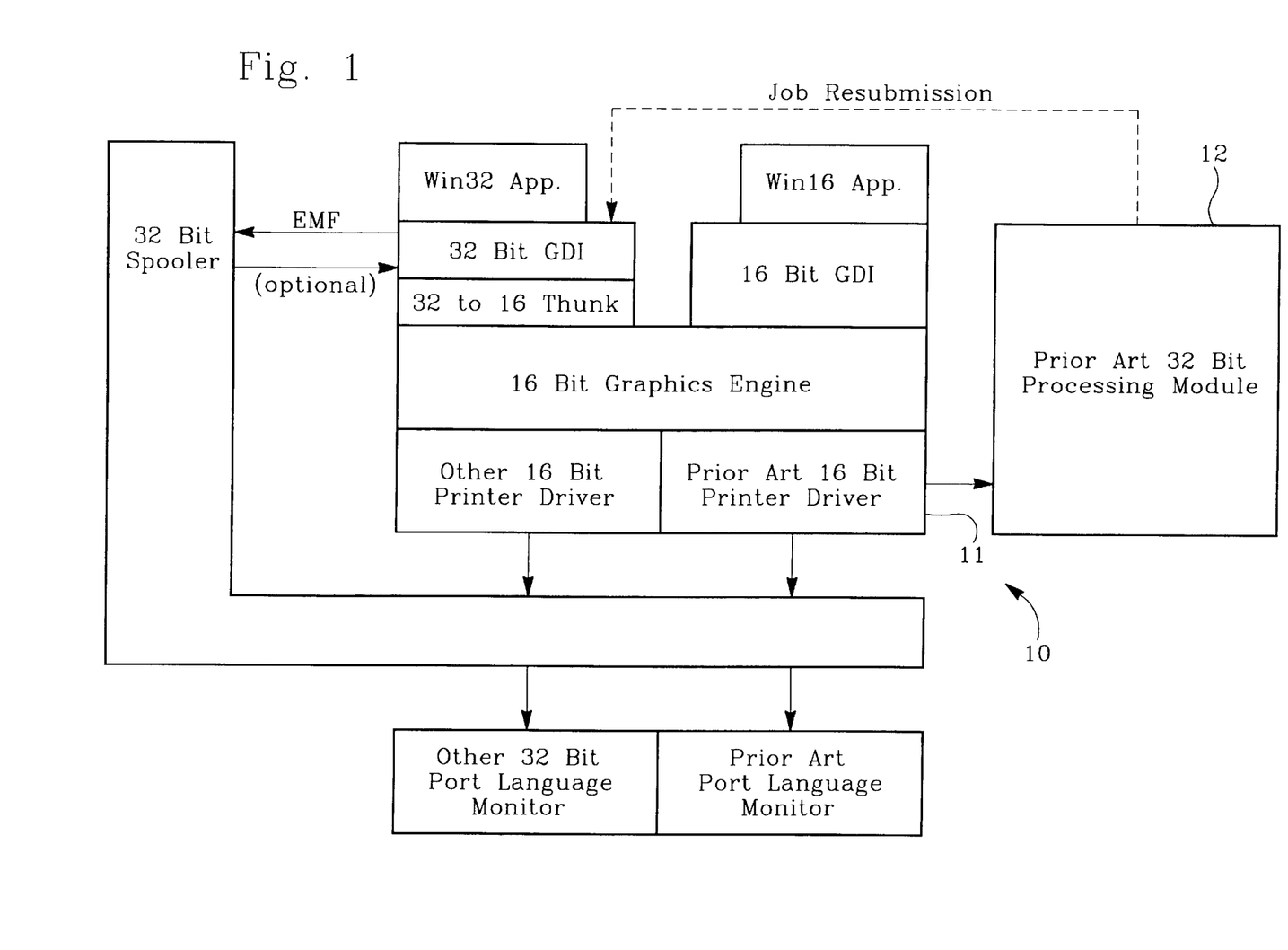
FIG. 1 is a block diagram showing the components of a typical prior art job editing and delivery system.

FIG. 1 shows the operation of a typical prior art job editing and delivery system 10 similar to the ones mentioned above. It is important to note that the figure is based entirely on a functional examination of the behavior of the existing systems and an examination of a Windows system after installing a prior art job editing and delivery system, without performing a disassembly of program instructions. In FIG. 1, the prior art system 10 captures the job using a custom printer driver 11. This printer driver 11 passes the job information to a 32-bit processing module 12, which in turn displays the job information so that a user may edit this job information. In the obvious implementation, job information (including imaging information) is passed into the prior art 32 bit processing module 12 and processed directly by the prior art system 10. This makes the prior art 32 bit processing module 12 (or any similarly implemented job editing and delivery system) impractical to reuse.

Reusing a job editing and delivery system is desirable because job information may come from many sources. For instance, job information may be supplied from an Enterprise Resource Planning (ERP) application from vendor such as SAP (which is the market leader in providing ERP applications). Although SAP jobs typically originate on a server machine, the end-user often issues the print command from client software running under Windows. Therefore, the user is unable to interact with their familiar Windows-based job editing and delivery system when they print from SAP (or other similar client/server applications).

To enable the prior art job editing and delivery system to be used when printing from SAP, it would be necessary to transmit the job from SAP to the end-user's PC, then funnel this information into the job editing and delivery system. Funneling the job information into a job editing and delivery system would be likely to involve the following steps:

(i) converting the job data into the intermediate representation used by the job editing and delivery system and thereby severely impact performance; and/or (ii) sending job data across process boundaries (requiring a copy), which also severely impacts performance.

Therefore, none of the known job editing and delivery systems appear to support re-use and there is no evidence that it is practical to re-use their printing software objects or modules.

SUMMARY OF THE INVENTION

Therefore, it is a general objective of the invention to alleviate the problems and shortcomings identified above.

One of the objectives of one aspect of the invention is to provide a reusable job editing and delivery system that permits a Windows user to edit and transmit a print job irrespective of the origin of the print job.

An objective of another aspect of the invention is to provide a reusable job editing and delivery system that makes use of standard component technologies so that the job editing and delivery system can be used by a different applications on different platforms.

An objective of another aspect the invention is to provide a printing software object that can be directly used by an application that originates a print job.

An objective of another aspect of the invention is to provide a printing software object that can be used by a printer driver conduit host that captures the print job data from the printing subsystem of an operating system.

An objective of another aspect of the invention is to provide a printing software object that can be used by a server conduit host that captures print job data from a server system which originates the print job.

These and other objectives are achieved by providing a computer implemented method by which a user edits and delivers a print job in a computer system, the method including the steps of: providing a printing software object as a Component Object Model ("COM") component for editing and delivering a print job; providing the job data of the print job to the printing software object, by a print job creator, in the form of references to pages; using the reference to pages, by the software printing object, to call and display the pages on a need basis; editing the job data of the print job by a user based on the displayed pages; and delivering the print job for processing in accordance with the edited job data.

Also provided is a printing software object as an in-process COM component.

Also provided is a method in which the printing software object is used directly by an application that is the print job creator.

Further provided is a computer implemented method in which the printing software object is used by a printer driver conduit host that captures print job data from the printing subsystem of the OS.

Also provided is a computer implemented method in which the software printing object is used by a server conduit host that captures print job data from a server system in which the print job data is created.

Further provided is a computer readable data storage medium having program code recorded thereon for a user editable print job editing and delivery system, the program code including: a first program code that provides a printing software object as a COM component for editing and delivering the print job; a second program code that provides job data of the print job to the printing software object, in the form of references to pages; the printing software object uses the reference to pages to call and display the pages on a need basis and edits the job data of the print job based on the user's response to the displayed pages; and a third program code that delivers the print job for processing in accordance with the edited job data.

DESCRIPTION OF THE DRAWINGS

The accompanying drawings, which are incorporated in and constitute a part of the specification, illustrate a presently preferred embodiment of the invention, and, together with the general description given above and the detailed description of the preferred embodiment given below, serve to explain the principles of the invention.

DETAILED DESCRIPTION OF THE INVENTION

In a general aspect, the present invention offers the following advantages over known technologies in the prior art:

(i) avoids the computational intensive conversion of imaging information into an unnecessary intermediate representation;

(ii) avoids copying job information across process boundaries;

(iii) facilitates the reuse of a job editing and delivery system by client/server printing software (such as SAP, UNIX systems, and mainframe systems); and (iv) simplifies reuse of a job editing and delivery system within application software.

To emphasize the advantages of the present invention it is worth noting that all known prior art job editing and delivery systems suffer from significant performance problems for the reasons mentioned earlier. The job must be transmitted from the application to the Operating Systems (OS's) printing system before the job is available (in its entirety) to the prior art job editing and delivery system. For example, if an application has two hundred pages in a job, all two hundred pages must be transmitted to the job editing and delivery system. If the job editing and delivery system were integrated into the application, it would be possible for the job editing and delivery system to request desired pages on a demand basis—thereby avoiding the need to process all the pages of the job.

To encourage application developers to go through the effort of integrating such a system, the system must be easy to integrate and integration must provide a marketable improvement for the application developer. Once integrated, the job editing and delivery system provided according to the present invention, can essentially becomes the application's print dialog box (or print preview).

As mentioned earlier, the present invention allows the printer hardware and software to expose its printing capabilities to a user. The best possible place to do this is in a manner seamlessly integrated into the application (i.e. using the print dialog box of the application) as provided in the present invention.

In a broad aspect, the present invention uses two new approaches to facilitate the goal of achieving a reusable job editing and delivery system.

In the first approach, the job editing and delivery system of the present invention is implemented as an in-process COM component that accepts job data from a variety of sources. Since COM is a well-known Windows standard, the system can be integrated into other software programs with relative ease. Since the COM component is in-process, no unnecessary copying of data from one process to another is required.

In the second approach, job data is provided to the job editing and delivery system in the form of references to pages. The system calls back to the provider of these pages to draw the pages on a demand or need basis. Thus, the present invention avoids the need for converting image data into an intermediate representation. Instead, the provider sends image data directly to Windows Graphics Device Interface ("GDI") as directed by the job editing and delivery system.

To facilitate the understanding of the preferred embodiment of the present invention a brief description of the Windows Graphics Device Interface (GDI) printing system and the Component Object Model (COM) is provided herewith. It is hereby acknowledged that any trademarks and trade names referenced herein are the property of their respective owners.

The COM is a component software architecture that allows applications and systems to be built from components that can be provided by different software vendors on different computer platforms. An important feature of COM is that it provides a mechanism by which binary software components supplied by different software vendors are able to connect and communicate with each other using a well defined interface. This interface mechanism is provided by COM which is a component software architecture developed by Microsoft that:

(i) defines a binary standard for component interoperability;

(ii) is programming language independent;

(iii) is provided on multiple platforms; and (iv) is extensible.

COM also provides mechanisms for the following functionalities:

(i) communication between components across process and network boundaries;

(ii) shared memory management among components;

(iii) error and status reporting;

(iv) dynamic loading of components;

(v) basic interoperability;

(vi) versioning; and (vii) transparent cross process interoperability.

Some of the fundamentals that underlie COM include:

(i) a binary standard for calling functions between components;

(ii) a provision for grouping strongly typed functions into interfaces;

(iii) a base interface that allows components to determine the interfaces implemented by other components and a reference counting mechanism that allows components to track their own lifetime;

(iv) a component loader that sets up component interactions and manage the component interactions in cross-process and cross-network situations.

Appendix A provides further description of the COM model, the contents of which are incorporated herein in their entirety. Appendix B provides a description of the GDI printing system, the contents of which are incorporated herein in their entirety. These appendices incorporate public information provided on the Microsoft internet website and all rights therein belong to Microsoft.

Figure 2A:
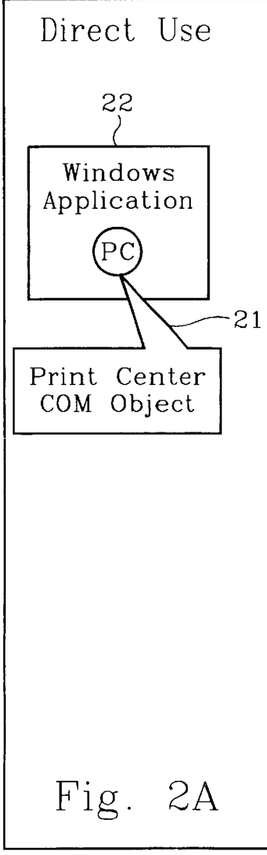
FIGS. 2a–2d illustrate the use of a printing software object as an in-process COM object.

With reference to the figures, FIGS. 2a–2d illustrates the use of a printing software object as an in-process COM object. FIG. 2a illustrates that a job editing and delivery system provided printing software object 21 is depicted being used directly by a client Windows application 22. It should be understood that the client application is not limited to the Windows environment but includes any other client operating environment that supports a component object model such as COM.

Figure 2B:
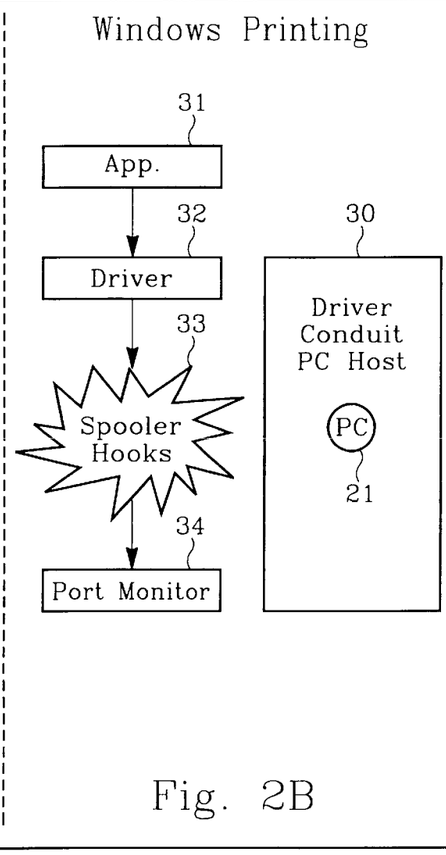

FIG. 2b shows the printing software object 21 being used by a driver conduit host 30 that operates with print job information captured from the Windows printing system. That is, an application 31 transmits a print job to a printer driver 32 which is programmed to interact with a spooler 33 and a port monitor 34 to route the print job to an appropriate printer (not shown in the figure). The specially programmed printer driver 32 that captures the print job information is one embodiment of a subsystem referred to hereafter as the job capture subsystem ("JCSS") of the job editing and delivery system of the present invention.

It should be noted that developing the program code to capture the print job information from the printer driver 32 is within the abilities of one skilled in the art. For example, in one such implementation in the Windows environment, since the printer driver is in the 16 bit subsystem, use is made of the Windows operating system provided "thunk" functions. These thunk functions provide a way of calling 16 bit functions to make method calls to code running in the 32 bit subsystem, such as the driver conduit host 30. These thunk functions are a software mechanism allowing a 16 bit program to call a 32-bit dynamically linked library (DLL) under a 32 bit Windows OS. The 16 bit program that seeks to call an entry in a 32-bit DLL instead calls a corresponding entry in a 16-bit DLL. The programmer must also include code to detect whether the 32-bit DLL is loaded. A 32-bit EXE module loads the 32-bit DLL. Therefore, the thunking mechanism can be used by a skilled programmer to communicate between the printer driver 32 operating in the 16 bit subsystem and the driver conduit host 30 running in the 32 bit subsystem of the Windows environment.

Figure 2C:
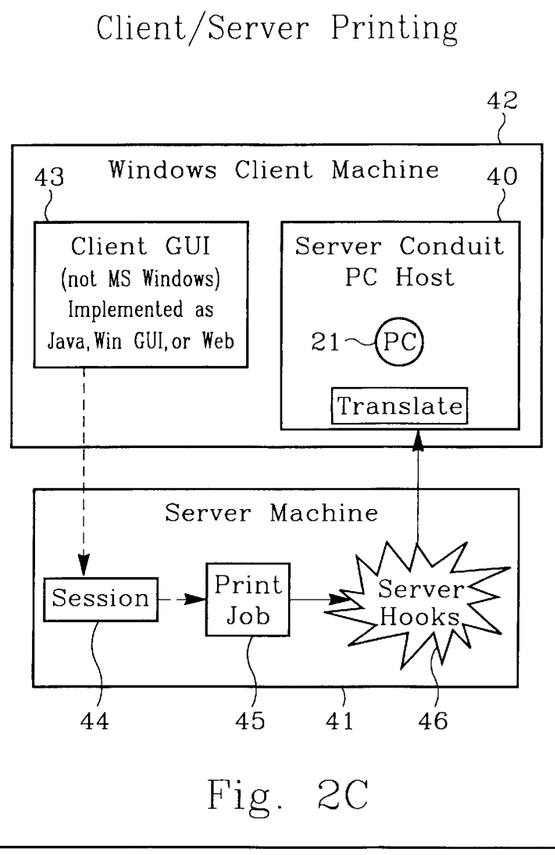

FIG. 2c illustrates the printing software object 21 being used by a server conduit host 40 that operates with print job information captured from a server based system 41 (for e.g., SAP, UNIX, mainframe) by another embodiment of the job capture subsystem. Therefore, a client Graphical User Interface ("GUI") application on a Windows client machine 42 connects to a session 44 on the server machine 41 to create a print job 45. Server hooks 46 provided in the server machine 41 by the present invention capture any required print job information and transmit the same to the server conduit host 40 so that the printing software object 21 may provide a window for a user to edit or modify the transmitted print job information.

Figure 2D:
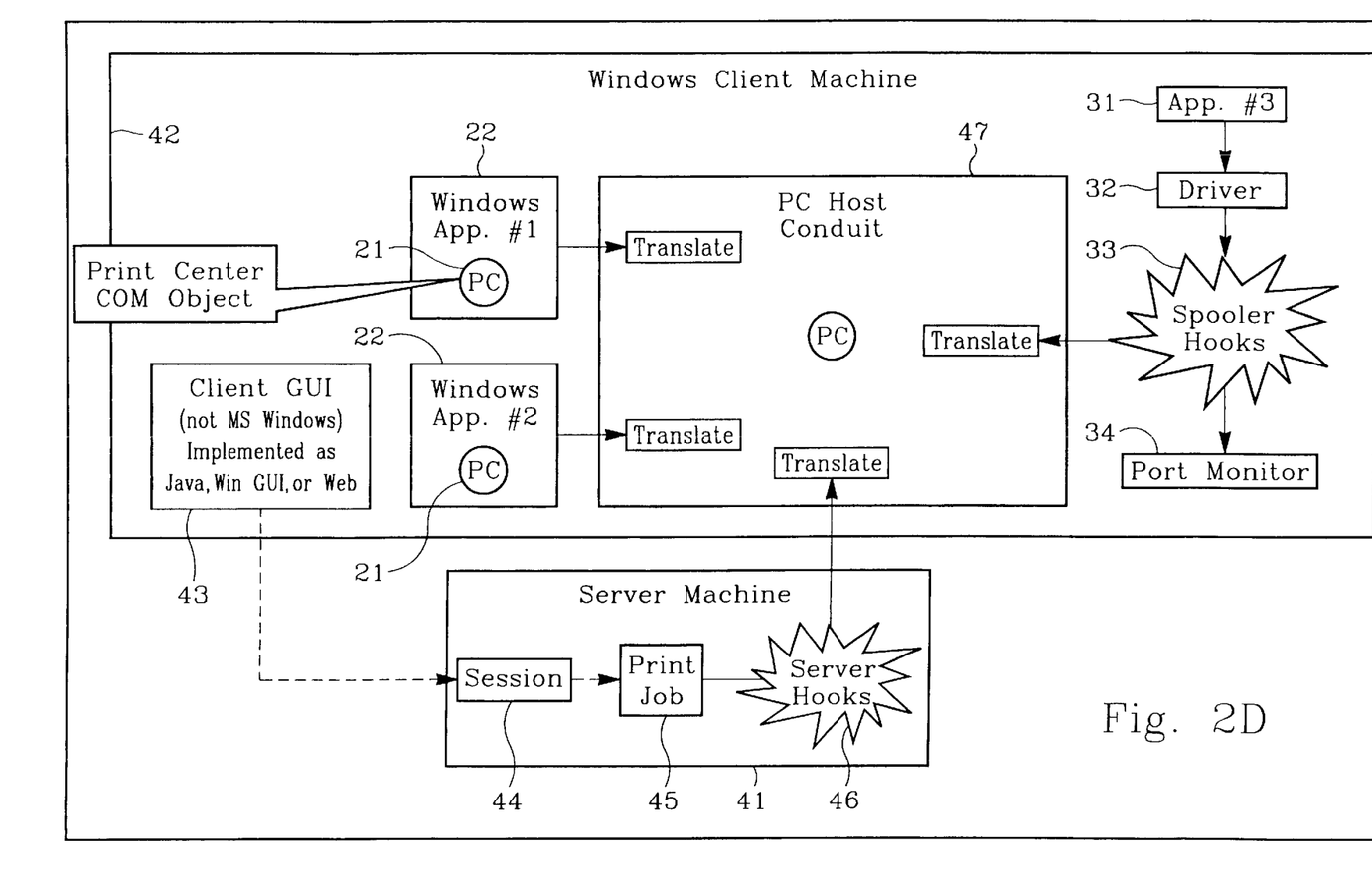

FIG. 2d illustrates another use of the printing software object 21 in a shared use environment in which the printing software object 21 is provided in a centralized PC conduit host 47. The centralized PC conduit host 47 then coordinates all the printing from the different sources of print job data. Therefore, as shown in the figure, the PC Conduit host 47 coordinates printing from a Windows applications 22, each containing a printing software object 21 which is modified as described further herein. The PC conduit host 47 also interacts with the specialized printer driver 32 and the spooler hooks 33 to coordinate the editing and delivery of print job data captured by the printer driver 32 and the spooler hooks 33. The PC conduit host 47 also interacts with the print job information captured from a server system 41 through the server hooks 46. Therefore, the PC host conduit 47 is capable of receiving print job information from several different sources, such as other applications, printer drivers, and other servers, and serves as a central printing center for a final job editing and delivery for a combined set of page images.

In the shared use scenario shown in FIG. 2d, applications 22 have integrated printing software objects 21 that are specially configurable. The specially configurable software printing objects are configurable to "defer" their page image sets to the centralized host conduit 47. Some of the configurable options of the defer feature could include: (i) defer only upon request (i.e., user selects whether a job should be deferred); (ii) automatic/smart deferral (i.e., the printing software object 21 defers if it detects that a centralized PC host conduit 47 is already running; or (iii) always defer (i.e., output is always sent to the centralized PC host conduit 47). If the defer option is selected, the applications' in-process software printing COM object 21 would defer to the PC host conduit 47 by sending the print job information to the PC host conduit using an intermediate format, such as, EMF or a custom defined format. While this defer feature imparts some performance penalties, it provides the benefit that the print job output from these applications can be combined from the print job outputs from other sources, such as other applications, printer drivers or other servers. It should be noted that while the in-process COM objects are used in the preferred embodiment, it is also possible to use COM's out of process activation features.

In each of these uses of the printing software object 21, the implementation of the COM component could be identical, i.e., the COM object 21 could be instantiated using the same COM component. Microsoft specifies a standard method for discovering the presence of COM components in the definition of the COM component architecture. Therefore, in each of these situations, this standard method is used to locate the COM component and the COM component can be easily shared amongst them.

Furthermore, the COM component can be upgraded independently of the software that uses the COM component. This allows all the software that uses the COM component to benefit when it is upgraded. Finally, by sharing a common COM component, software using the COM component could be designed consistently with other software that uses the COM component, that is, have the same user interface and behavior related to printing.

In the implementation illustrated in FIG. 2*b*, the Windows printing case, printer drivers are involved twice. First, the specially programmed printer driver 32 is involved to capture the print job from the Windows printing system. The printer driver 32 is responsible for translating job information into a form that allows it to be passed out of printer driver mode (for example, kernel mode on Windows NT, 16 bit mode on Windows 9x) and into application mode (i.e., for example, the 32 bit WIN32). Thereafter, a second printer driver (i.e., a standard printer driver) is potentially involved in translating the job information into a format recognized by a selected target printer after the user has selected a target printer using the job editing and delivery system of the present invention. Alternatively, the job editing and delivery system of the present invention can itself translate the print job information to an appropriate printer language and forward for printing. The details of this involvement of the printer driver 32 are not provided here because they are within the abilities of one skilled in the art and are not essential to understanding the features of the present invention. This invention is focused on providing information about the interface between the interchangeable job capture subsystem (corresponding to the different operating platforms and applications) and the constant job editing and delivery subsystem provided in accordance with the job editing and delivery system of the present invention.

In the direct use implementation illustrated in FIG. 2(*a*), the interface provided by the COM printing software object 21 serves to broaden the capabilities provided by the standard Windows printing system. For example, Windows does not provide a mechanism to obtain a real print preview that reflects printer settings. However, the printing software object 21, according to the present invention, provides a real print preview reflecting printer settings that can now be provided by the application 22 to the user. This is just one example of how the printing software object 21 in accordance with the present invention provides extended capabilities (over the standard Windows printing system) that are made available to a user of an application 22 that generates the print job.

Therefore, the present invention provides for the implementation of a job editing and delivery system as a COM object, as described above. This implementation has at least the following advantages:

(i) Unneeded copying of job data between processes is avoided by passing references to pages, rather than detailed imaging information, between components as discussed further herein;

(ii) COM is a widely recognized component standard for the Windows environment, therefore, implementing Windows software as a COM component facilitates its reuse; and (iii) COM provides a repository for components that can be searched by client software using predefined standard interfaces. This repository enables client software to share the same COM component, thus facilitating consistency amongst applications and ensuring that all applications benefit when the COM component is upgraded.

Figure 3:
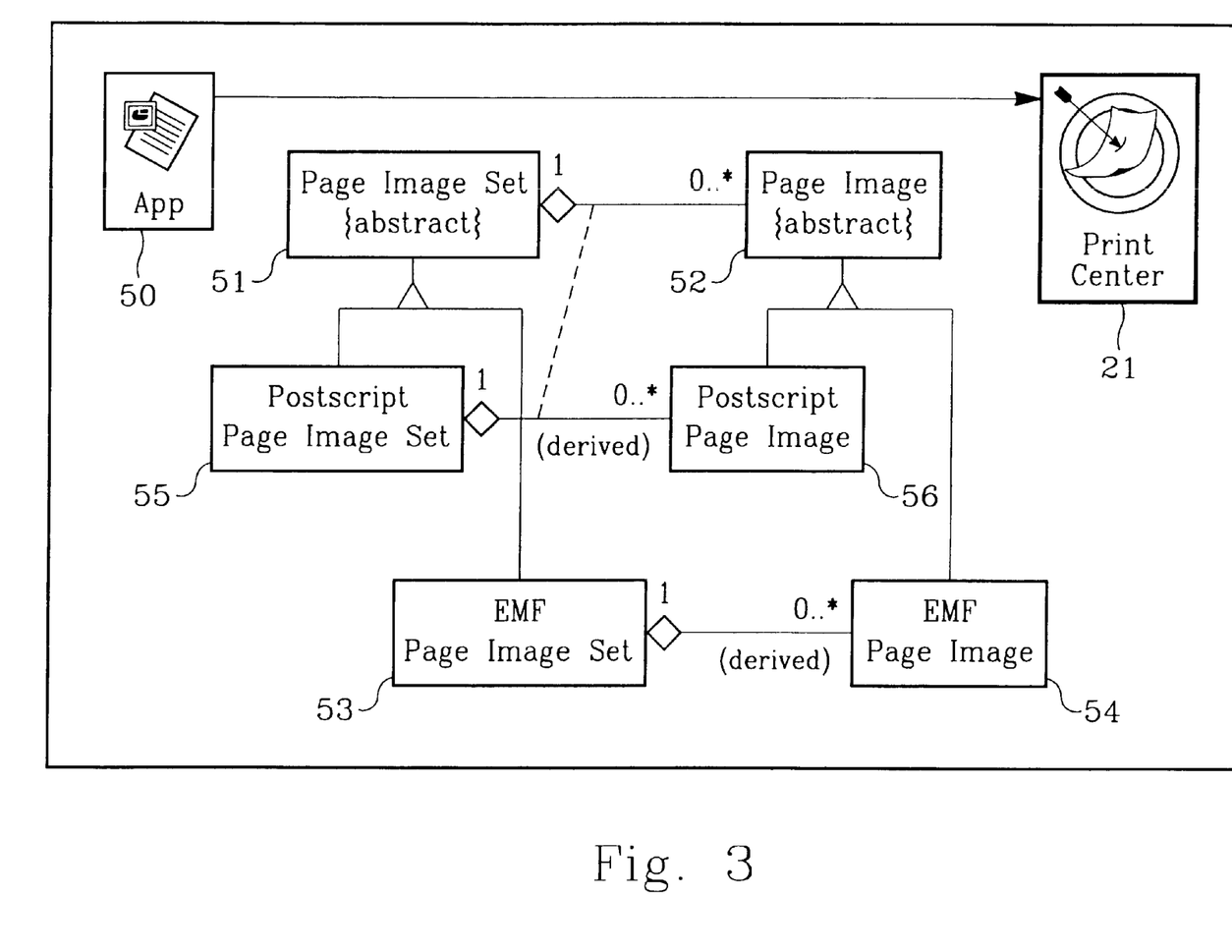
FIG. 3 is a Unified Modeling Language (UML) diagram depicting the passing of job data between an application and the job editing and delivery system according to the present invention.

Another feature of the present invention provides that job data is provided to the printing software object in the form of references to pages (where the provider of the job data is responsible for drawing the pages). This method of providing job data has several advantages. FIG. 3 is a UML diagram that depicts the passing of job data between an application 50 and the job editing and delivery system (i.e. printing software object 21).

In FIG. 3, the application 50 represents any of the possible sources of image data including applications such as the windows application 22 in FIG. 2*a*, drivers that capture job information such as the printer driver 32 in FIG. 2*b*, and special software that provide job information from server systems (e.g. SAP), such as the server hooks 46 in FIG. 2*c*.

FIG. 3 shows a UML class diagram. The UML class diagram illustrates that the Page Image Set objects 51 possessing Page Image objects 52 are passed from the job information source (i.e. application 50) to the job editing and delivery subsystem (i.e. printing software object 21). The Page Image Set objects 51 and the Page Image objects 52 are abstract objects. The actual concrete types (or instances) of these objects possess a specific kind of imaging information. Therefore, the actual relationships between the concrete objects is derived from the "has" relationship between the abstract objects Page Image Set and Page Image. For example, one implementation of the abstract Page Image Set object 51 and Page Image objects 52 might use Enhanced Meta File (EMF) format. As shown in the FIG. 3, the concrete EMF Page Image Set object 53 is composed of concrete EMF Page Image objects 54 ("has" relationship). Likewise, another implementation might use Postscript format. Therefore, the concrete Postscript Page Image Set 55 is composed of concrete Postscript Page Image objects 56.

Figure 4:
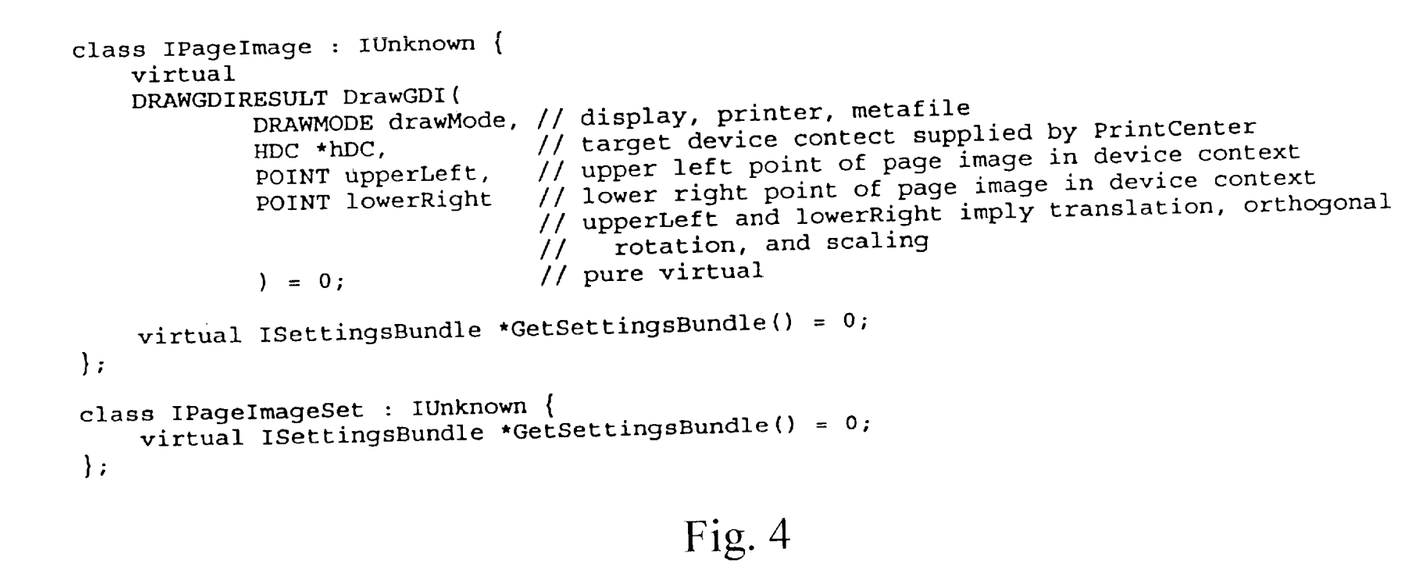
FIG. 4 illustrates sample program code that implements an exemplary list of functions that might be found in the Page Image Set and Page Image interfaces according to the present invention.

An exemplary list of functions that might be found in the Page Image Set 51 and Page Image 52 interfaces is shown in FIG. 4 in C++ programming language for illustrative purposes.

As shown in FIG. 4, the class IpageImage interface supplies two functions. A DrawGDI function is responsible for drawing on the supplied Device Context (DC) using the transform, rotation, and scaling implied by the provided upperLeft and lowerRight points. A drawMode parameter is also supplied so that the interaction with GDI can be altered as appropriate. This enables the page image provider to adapt the GDI calls based on the type of device context (display, printer, or metafile). For example, it is not uncommon for applications to interact differently with the GDI depending on whether the application is displaying or printing.

The function GetSettingsBundle, shown in FIG. 4, retrieves a settings bundle data structure, which is not described in detail here because it is not necessary for understanding the claimed invention. Individual pages can have settings associated with them, for example, a setting which determines what media type to print on. The job editing and delivery system, such as the software printing object 21 uses these settings to determine what settings to apply to logical and physical pages, which are distinct from page images, as discussed further herein.

Similarly, the IpageImage interface provides a GetSettingsBundle method (or function), which retrieves an ISettingsBundle data structure (or a bundle of data). This bundle contains settings that are relevant to the entire set of pages possessed within a page image set. For example, this bundle might contain settings such as whether or not to collate the pages and the number of copies desired. Settings that apply to images may also be stored within the page image set settings bundle. Doing so applies the page image setting to all the pages within the page image set as if the setting were stored in each individual page image. Individual page image settings do however override page image set settings.

Returning to FIG. 3, the application 50 is responsible for implementing both the IpageImage and IpageImage interfaces and using these interfaces to pass the print job description to the job editing and delivery system as implemented by the printing software object 21. To accomplish this, the application 50 must interact with an interface provided by the job editing and delivery system.

Figure 5:
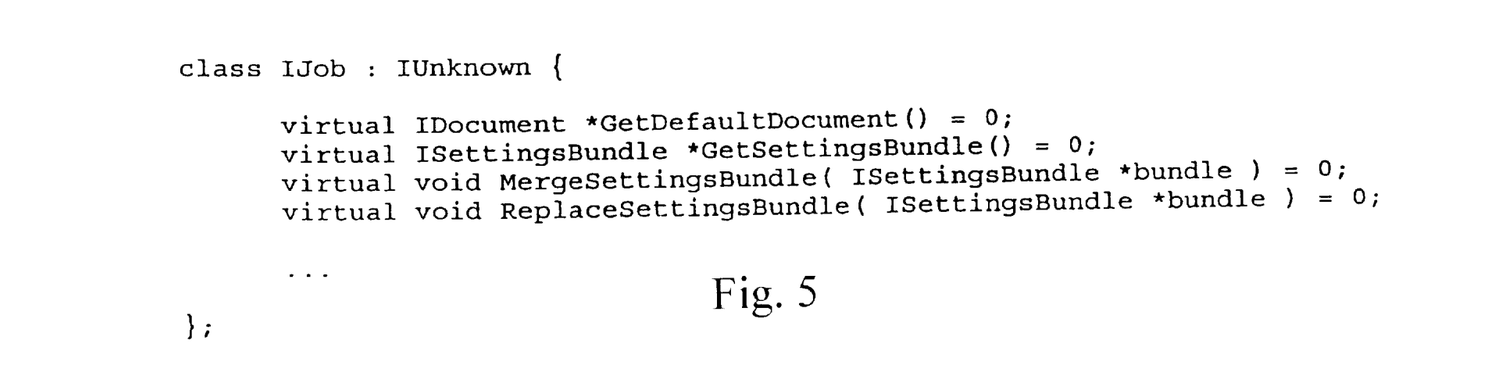
FIG. 5 illustrates pseudocode for an exemplary interface to the job editing and delivery system according to the present invention.

FIG. 5 illustrates pseudocode for an exemplary interface to the Job Editing and Delivery System provided by the present invention. The pseudocode illustrated in FIG. 5 for IJobEditingAndDeliverySystem interface defines two methods. The first method, AcceptPageImages, is used to introduce page images into the job editing and delivery system. This method accepts a page image set and a collection of page images. The job editing and delivery system makes the association between the page image set and the page images based on the page images and page image set passed as parameters to a same method invocation. The same page image set may be used to add additional page images to the page image set. The page images in a page image set are ordered. Additional pages added to a page image set are appended to the page image set.

Once within the job editing and delivery system, the page images are processed according to the current setting associated with a job. Some examples of job settings include the number of copies, duplex printing, stapling and other paper handling options. Modifying the job object and its constituents can alter the settings associated with the job. The GetJob function enables the application 50 to gain access to the job for modification purposes.

Figure 6:
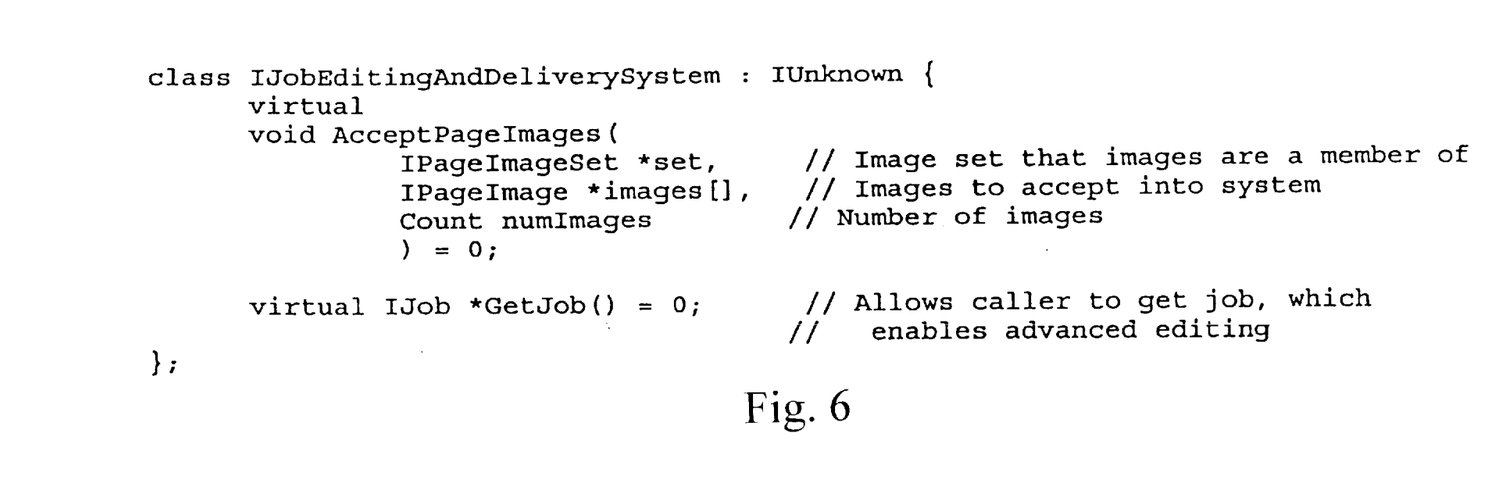
FIG. 6 is an illustration of a sample job interface according to the present invention.

FIG. 6 is an illustration of a sample job interface pseudocode implementation. This sample interface illustrated in FIG. 6 provides method prototypes for gaining access to the jobs constituents, such as the documents that make up the print job by the GetDefaultDocument( ) method. It also provides access to the jobs settings through the ISettingsBundle( ) method and methods to modify these settings by replacement or by merging by providing, for example, a MergeSettingsBundle( ) method and a ReplaceSettingsBundle( ) method, respectively. Implementing the program code that implements these and other methods discussed herein is within the abilities of one skilled in the art and further implementation details of these methods are not provided because they are not necessary for an understanding of the claimed invention.

Figure 7:
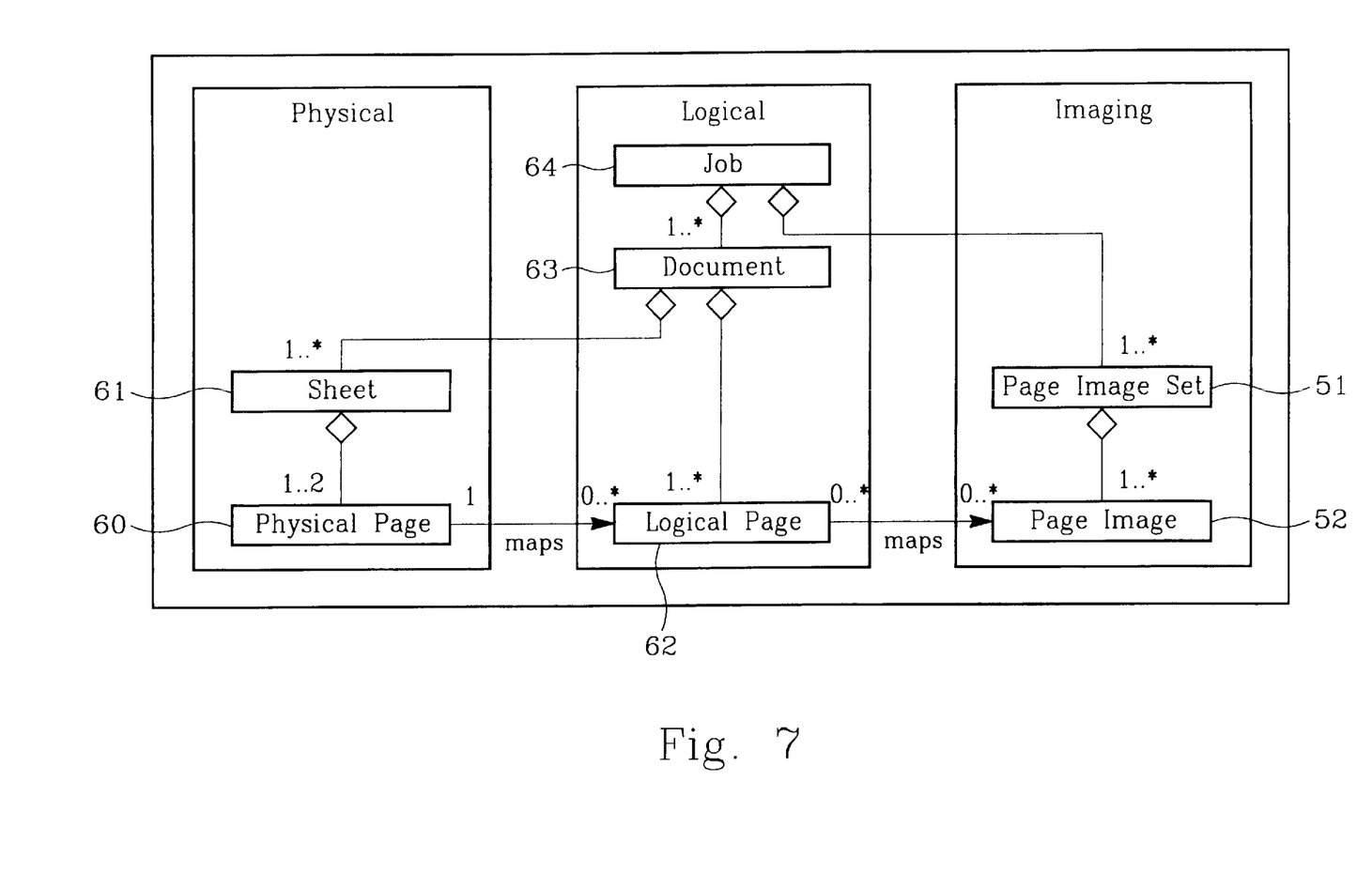
FIG. 7 illustrates the structure of a print job as a modified UML class diagram.

FIG. 7 depicts the structure of a print job as a modified UML class diagram. Each class depicted in FIG. 7 provides similar interfaces for access and modification of the class settings and constituents. For brevity, the details of each of these classes are omitted as they are not essential for an understanding of the invention Using the interfaces provided by each of these classes, an application can navigate the structure of the job and make alterations to the settings associated with the job. It is important to note, that these modifications will not typically be required since most settings of concern may be provided by associating them directly with a page image set or a page image (i.e. settings will be applied to the logical page or document).

FIG. 7 displays that at a physical level one or more physical pages 60 (to be printed) form one or more sheets 61. At the logical level, one or more logical pages 62 make up one or more documents 63. One or more documents 63, in turn, make one or more print jobs 64. One physical page 60 maps to zero or more logical pages 62. At the imaging level, one or more Page Images 52 makes one or more Page Image Sets 51. One or more Page Image Sets 51 make up the print job 64. Zero or more logical pages 62 in turn maps to zero or more Page Images 52. Therefore, the present invention provides that print job information is provided in the form of references to pages as discussed above with reference to FIG. 3.

Accepting job data in the form of page objects, as provided in the present invention, provides significant advantages. Some of these advantages are:

(i) because the job data provider does not need to convert job data into an extra intermediate format, performance is drastically improved;

(ii) because the job data provider (i.e. application) already has written program code to draw to the GDI, the amount of effort required to adapt printing to support the job editing and delivery sub system is minimal;

(iii) because the imaging interface used is the GDI, there is no need to document or create a proprietary intermediate imaging representation;

(iv) the work of creating a conduit (special job data provider or jab capture subsystem that captures a job from an existing printing system) is neatly split between the conduit and the job editing and delivery subsystem. The conduit is responsible for capturing the job information, transmitting it to a host application, and providing the job information in page increments as objects. The job editing and delivery system can, therefore, be developed independently of the conduit. This enables a great deal of parallelism in software development and scheduling.

(v) converting the page is avoided until absolutely needed. The job editing and delivery subsystem, according to the present invention, only requests the job data provider to draw the page when the page absolutely needs to be drawn on the screen, printed, or converted to a metafile format (vi) GDI and COM are Microsoft originated (and endorsed) technologies and are widely used for the commercial software development and implementation.

(vii) The job editing and delivery system is independent of the imaging model. Therefore, the present invention is equally adaptable to all the imaging systems that are in use (DDI, PostScript, etc.) to the extent that they map back to GDI.

Figure 8:
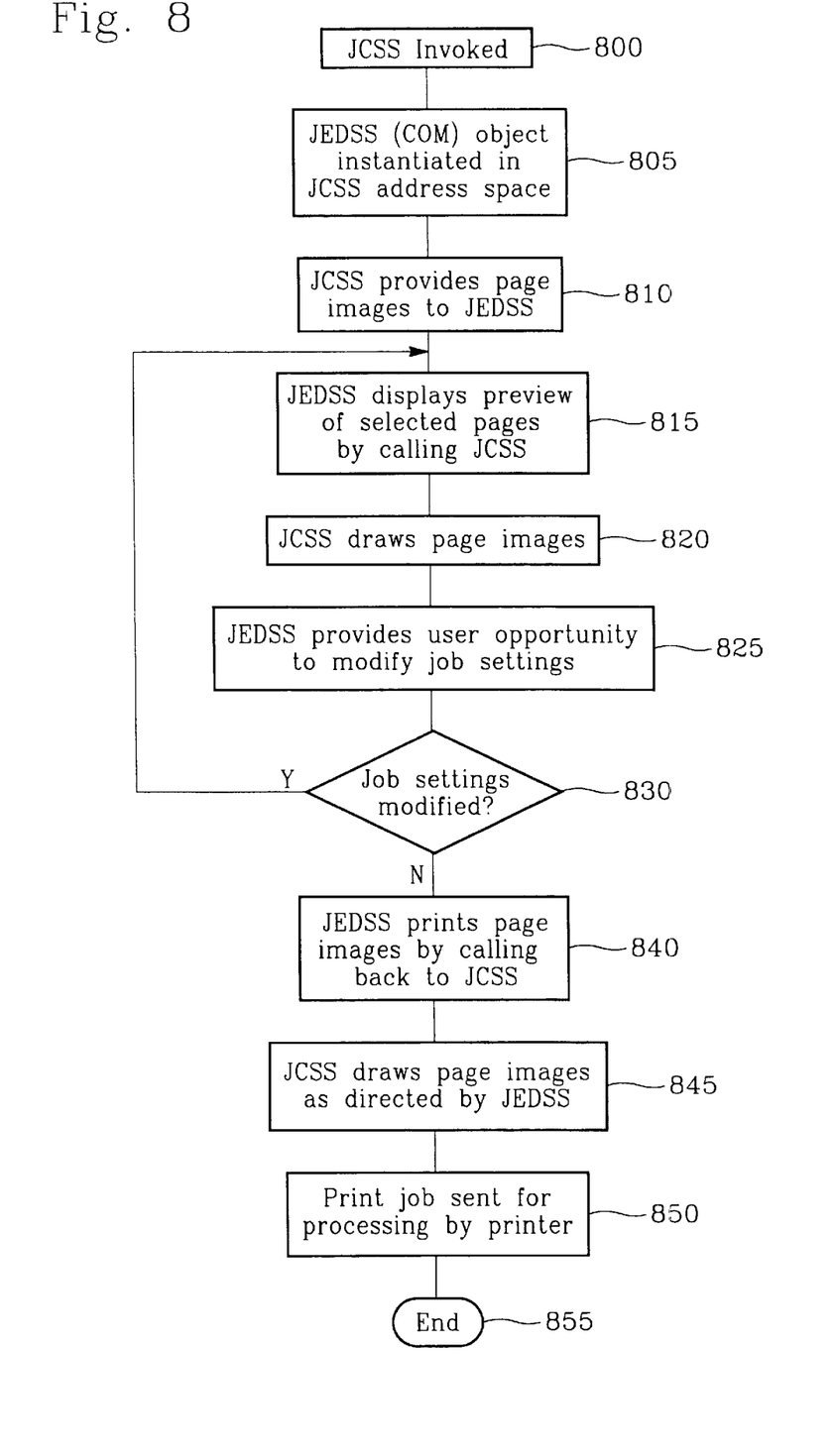
FIG. 8 is a flow diagram showing the operation of the job editing and delivery system according to the present invention.

FIG. 8 is a flow diagram that shows the operation of a preferred embodiment of the job editing and delivery system in accordance with the present invention. In the preferred embodiment, the job editing and delivery system has a job capture subsystem and a job editing and delivery subsystem. In step 800, the job capture subsystem ("JCSS") is invoked. A JCSS can be invoked on multiple machines and in multiple address spaces and serves to capture print job information from the different sources of the print job information, such as applications, specialized printer drivers or other server applications. In step 805, the job editing and delivery subsystem ("JEDSS"), a COM object, is instantiated in one of the JCSS address spaces.

In step 810, the JCSS provides the print job information, in the form of page image references, to the JEDSS. In step 815 the JEDSS displays previews of selected pages by calling the JCSS and JCSS draws the page images in step 820 in response to the call from the JEDSS. Thereafter, the JEDSS provides the user an opportunity to modify the job settings in step 825.

IN step 830, the JEDSS checks if any job settings have been modified, and if so, the JEDSS displays a preview of the relevant pages with modified job settings by proceeding to steps 815 and 820. If there are no job setting changes in step 830, the JEDSS prints the page images by calling back to the JCSS in step 840 with the appropriate device context for printing or writing to metafile.

In step 840, the JEDSS prepares to print the page images by calling back to JCSS with an appropriate device context and thereby providing it instructions on printing or outputting the page images. The JEDSS provides the JCSS the device context for printing or storing the pages in a metafile.

In step 845, the JCSS draws the page images in accordance with the instructions provided by the JEDSS. For example, if the JEDSS provides a metafile device context in step 840, the JCSS then draws to the provided device context. Thereafter, if the JEDSS obtains a metafile from the JCSS, the JEDSS is then responsible for translating the metafile to a suitable printer language and sending to the printer for further processing in step 850. If the JEDSS provides a printer device context in step 840, the JCSS uses an existing printer driver which converts the GDI calls made by the JCSS to the appropriate printer language and sends the job for processing by a printing system in step 850. In an alternative embodiment, the job editing and delivery system of the present invention can itself translate the print job information to an appropriate printer language and forward for printing. After processing by the printing system in step 850, the processing cycle for the job editing and delivery system is completed in step 855.

In step 850, the printing system either prints the job in accordance with the device context and job data provided by the JCSS in step 845 or stores the job in a storage medium for future processing. The stored job includes the storage of the job translated to a suitable printer language such as PCL or postscript.

It should be noted that, in the preferred embodiments the print job data edited or modified by a user does not include directly modifying the imaging data. The print job data modifiable by user typically includes rotation, translation, and scaling of images, paper handling and collating features, overlays, underlays, filters, and the like. A filter can be used to convert a page image to a metafile and thereafter the metafile can be edited to indirectly modify the imaging information.

Other embodiments of the invention will be apparent to those skilled in the art from a consideration of the specification and the practice of the invention disclosed herein. It is intended that the specification be considered as exemplary only, with the true scope and spirit of the invention being indicated by the following claims.

What is claimed is:

1. A computer implemented method by which a user edits and delivers a print job in a computer system, the method comprising the steps of:

providing a printing software object as a COM component for editing and delivering a print job;

providing job data of the print job to the printing software object, by a print job creator, in the form of references to pages;

using the reference to pages, by the software printing object, to call and display the pages on a need basis;

editing the job data of the print job by user based on the displayed pages; and delivering the print job for processing in accordance with the edited job data, wherein the software printing object is provided as an in-process COM component; and wherein the software printing object is used by a printer driver conduit host that receives the print job data captured from the printing subsystem of the OS.

2. A computer implemented method by which a user edits and delivers a print job in a computer system, the method comprising the steps of:

providing a printing software object as a COM component for editing and delivering a print job;

providing job data of the print job to the printing software object, by a print job creator, in the form of references to pages;

using the reference to pages, by the software printing object, to call and display the pages on a need basis;

editing the job data of the print job by user based on the displayed pages; and delivering the print job for processing in accordance with the edited job data, wherein the software printing object is provided as an in-process COM component; and wherein the software printing object is used by a server conduit host that receives the print job data captured from a server system on which the print job is created.

3. A computer readable data storage medium having program code recorded thereon for a user editable print job editing and delivery system, the program code comprising:

a first program code that provides a printing software object as a COM component for editing and delivering the print job;

a second program code that provides job data of the print job to the printing software object, in the form of references to pages;

wherein the printing software object uses the reference to pages to call and display the pages on a need basis and edits the job data of the print job based on the user's response to the displayed pages; and a third program code that delivers the print job for processing in accordance with the edited job data, wherein the software printing object is provided as an in-process COM component, and wherein the software printing object is usable by a printer driver conduit host that receives the print job data captured from the printing subsystem of the OS.

4. A computer readable data storage medium having program code recorded thereon for a user editable print job editing and delivery system, the program code comprising:

a first program code that provides a printing software object as a COM component for editing and delivering the print job;

a second program code that provides job data of the print job to the printing software object, in the form of references to pages;

wherein he printing software object uses the reference to pages to call and display the pages on a need basis and edits the job data of the print job based on the user's response to the displayed pages; and a third program code that delivers the print job for processing in accordance with the edited job data, wherein the software printing object is provided as an in-process COM component, and wherein the software printing object is usable by a server conduit host that receives the print job data captured from a server system on which the print job is created.

5. A computer implemented method by which a user edits and delivers a print job in a computer system, the method comprising the steps of:

providing a printing software object as a COM component for editing and delivering a print job;

providing job data of the print job to the printing software object, by a print job creator, in the form of references to pages;

using the reference to pages, by the software printing object, to call and display the pages on a need basis;

editing the job data of the print job by user based on the displayed pages; and delivering the print job for processing in accordance with the edited job data, wherein the software printing object is provided as an in-process COM component; and wherein the software printing object is used directly by a centralized host conduit that receives the print job data from a plurality of print job data sources.

6. A computer readable data storage medium having program code recorded thereon for a user editable print job editing and delivery system, the program code comprising:

a first program code that provides a printing software object as a COM component for editing and delivering the print job;

a second program code that provides job data of the print job to the printing software object, in the form of references to pages;

wherein the printing software object uses the reference to pages to call and display the pages on a need basis and edits the job data of the print job based on the user's response to the displayed pages; and a third program code that delivers the print job for processing in accordance with the edited job data, wherein the software printing object is provided as an in-process COM component; and wherein the software printing object is used directly by a centralized host conduit that receives the print job data from a plurality of print job data sources.

7. A computer implemented method by which a user edits and delivers a print job in a computer system, the method comprising the steps of:

providing a job editing and delivery subsystem as a COM object for editing and delivering the print job;

providing a job capture subsystem for capturing page images and providing print job information to the job editing and delivery subsystem;

displaying a preview of selected pages by the job editing and delivery subsystem by calling back to the job capture subsystem to draw the selected page images;

editing the print job information by the user viewing the preview of the selected pages;

modifying the print job information by the job editing and delivery subsystem in accordance with the edited print job information;

transmitting for printing the modified print job information by the job editing and delivery subsystem calling back to the job capture subsystem;

drawing the page images by the job capture subsystem in accordance with the transmitted print job information from the job editing and delivery subsystem and forwarding the print job for processing by a printer; and processing the print job by the printer.

* * * * *

UNITED STATES PATENT AND TRADEMARK OFFICE
CERTIFICATE OF CORRECTION

PATENT NO. : 6,738,156 B1
DATED : May 18, 2004
INVENTOR(S) : Shell S. Simpson

It is certified that error appears in the above-identified patent and that said Letters Patent is hereby corrected as shown below:

Column 1,
Line 14, after "has" insert -- been --
Line 43, delete "sinciletrack" and insert therefor -- singletrack --

Column 4,
Line 44, delete "becomes" and insert therefor -- become --

Column 9,
Line 34, delete the second occurrence of "IpageImage" and insert therefor -- IpageImageSet --.

Column 10,
Line 16, after "inventor" insert -- . --
Line 52, delete "jab" and insert therefor -- job --
Line 67, after "format" insert -- . --

Column 11,
Line 30, delete "IN" and insert therefor -- In --

Column 13,
Line 18, delete "he" and insert therefor -- the --

Signed and Sealed this

Eleventh Day of January, 2005

JON W. DUDAS
*Director of the United States Patent and Trademark Office*